July 1, 1947.　　　　S. PINANSKI　　　　2,423,342
DISPENSING APPARATUS AND METHOD OF TREATING POPPED CORN
Filed March 20, 1945　　　3 Sheets-Sheet 1

Inventor
Samuel Pinanski

July 1, 1947. S. PINANSKI 2,423,342
DISPENSING APPARATUS AND METHOD OF TREATING POPPED CORN
Filed March 20, 1945 3 Sheets-Sheet 3

Inventor
Samuel Pinanski
by Roberts Cushman Grover
att'ys.

Patented July 1, 1947

2,423,342

UNITED STATES PATENT OFFICE 2,423,342

DISPENSING APPARATUS AND METHOD OF TREATING POPPED CORN

Samuel Pinanski, Brookline, Mass.

Application March 20, 1945, Serial No. 583,810

10 Claims. (Cl. 34—30)

This invention pertains to dispensing apparatus, and more especially to apparatus for dispensing comestibles of a type which should be delivered hot and crisp to the purchaser, for instance popped corn, potato chips, etc. Popped corn, potato chips and the like are customarily sold to the consumer in boxes or bags of a few ounces capacity. Customarily these materials, cooked and hot, are scooped up by the salesman from a container of large capacity and poured into the box or bag for immediate delivery to the consumer. Desirably, this large container should be of a type which fully displays its contents to the passer by, so that by its pleasing and appetizing appearance and also by the odor which emanates therefrom, the material within the container may attract the attention of the purchaser. Popped corn, potato chips, etc., are only palatable when crisp and brittle. However, popped corn in particular is very porous and absorbent of moisture and if freely exposed to the atmosphere may, in a very short time after it has been popped, absorb so much moisture as to become tough, tasteless and insipid. In many places in this country atmospheric moisture is normally so high that it is almost impossible to keep popped corn at the desired degree of crispness for any considerable length of time after it is popped, unless it be sealed tight from the air, and when it has once lost its freshness it is substantially impossible, by reheating or otherwise, to restore it to a palatable condition. However, I have discovered that if, after popping, the corn be maintained in a gentle current of air at a temperature approximating 120° F., the initial crispness and palatability of the material may be maintained for a long period, for instance for several weeks, even though the atmospheric moisture be high.

The principal object of the present invention is to provide a novel method of and apparatus for use in the dispensing of popped corn, potato chips, or other comestibles which must be kept crisp and brittle, whereby the initial crispness may be maintained, although the material is fully exposed to observation and freely accessible for removal in successive small amounts from the dispensing container. A further object is to provide dispensing apparatus having the above suggested characteristics, but of simple and inexpensive construction of a portable character and having a pleasing appearance, which is of rugged and durable construction, which is easily filled, and from which the contents may easily be dispensed, and which automatically maintains the proper temperature conditions and air velocity for insuring the desired result. A further object is to provide dispensing apparatus having the above characteristics which, when not in use, may be tightly closed to prevent entry of dust or moisture.

Other and further objects and advantages of the invention will be pointed out in the following more detailed description, and by reference to the accompanying drawings, in which Fig. 1 is a plan view of apparatus embodying the invention, with certain parts broken away and in horizontal section, and with the dispensing drawer in operative position;

Fig. 5 is a fragmentary detail in horizontal section on the line 5—5 of Fig. 4.

Figure 1:
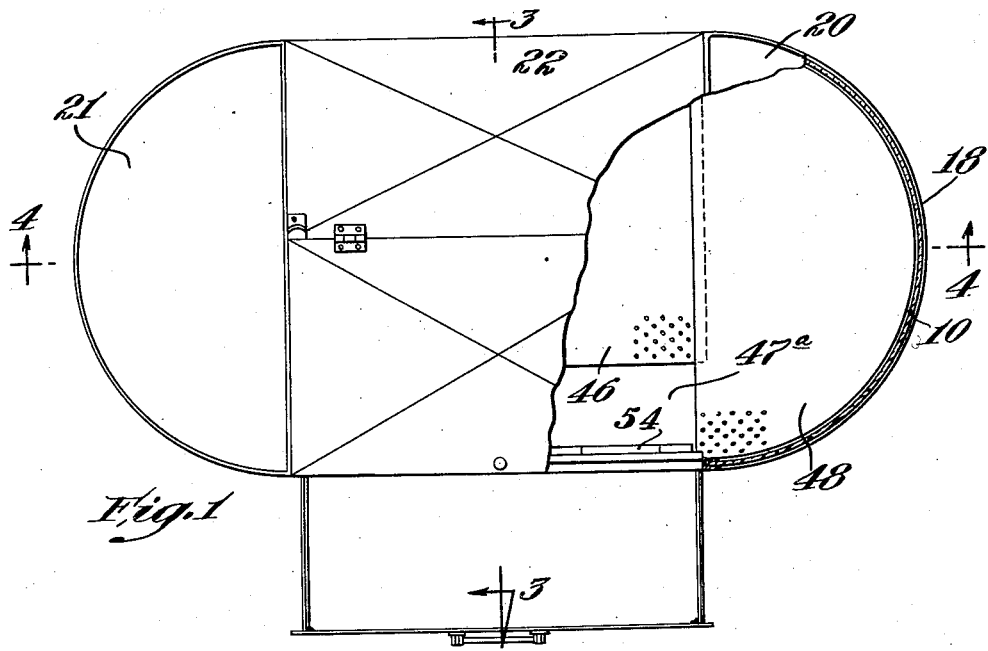

Referring to the drawings, the numeral 1 designates any suitable support, for example a table top, bench, or the top of a special cabinet designed for supporting and housing the various portions of the apparatus.

Figure 2:
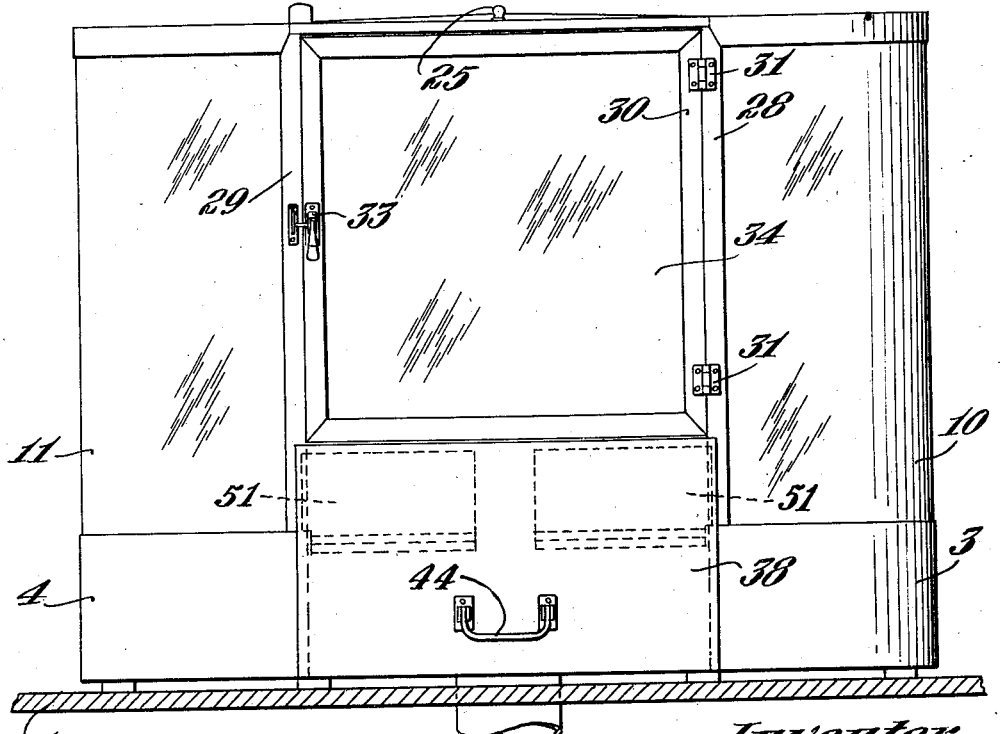
Fig. 2 is a front elevation of the apparatus shown in Fig. 1.

On this support 1 there is mounted the display and dispensing cabinet which, in a preferred construction, consists to a major extent at least of sheet metal and glass. This cabinet has a base portion comprising the bottom member 2 (Figs. 3 and 4) of sheet metal, the end walls 3 and 4 (Figs. 2 and 4), which in a preferred construction are of substantially semi-cylindrical shape in plan, and the rear wall 5 (Fig. 3), which is substantially straight. The forward edges of the walls 3 and 4 are spaced apart to provide for the reception between them of a dispensing drawer, as hereinafter described. The lower edges of the walls 3, 4 and 5 are secured to the bottom wall 2 in any desired manner, for example by usual rolled joints commonly employed in sheet metal work, or they may be otherwise or additionally united, for example by solder or welding. The upper portions of the walls 3 and 4 are stiffened and held rigidly in proper shape by means of angle bars 6 and 7 whose vertical flanges are bent to substantially the same semi-cylindrical curvature as the walls 3 and 4. The vertical flanges of these bars 6 and 7 are secured to the walls 3 and 4, as for example by spot welding or the like.

Figure 3:
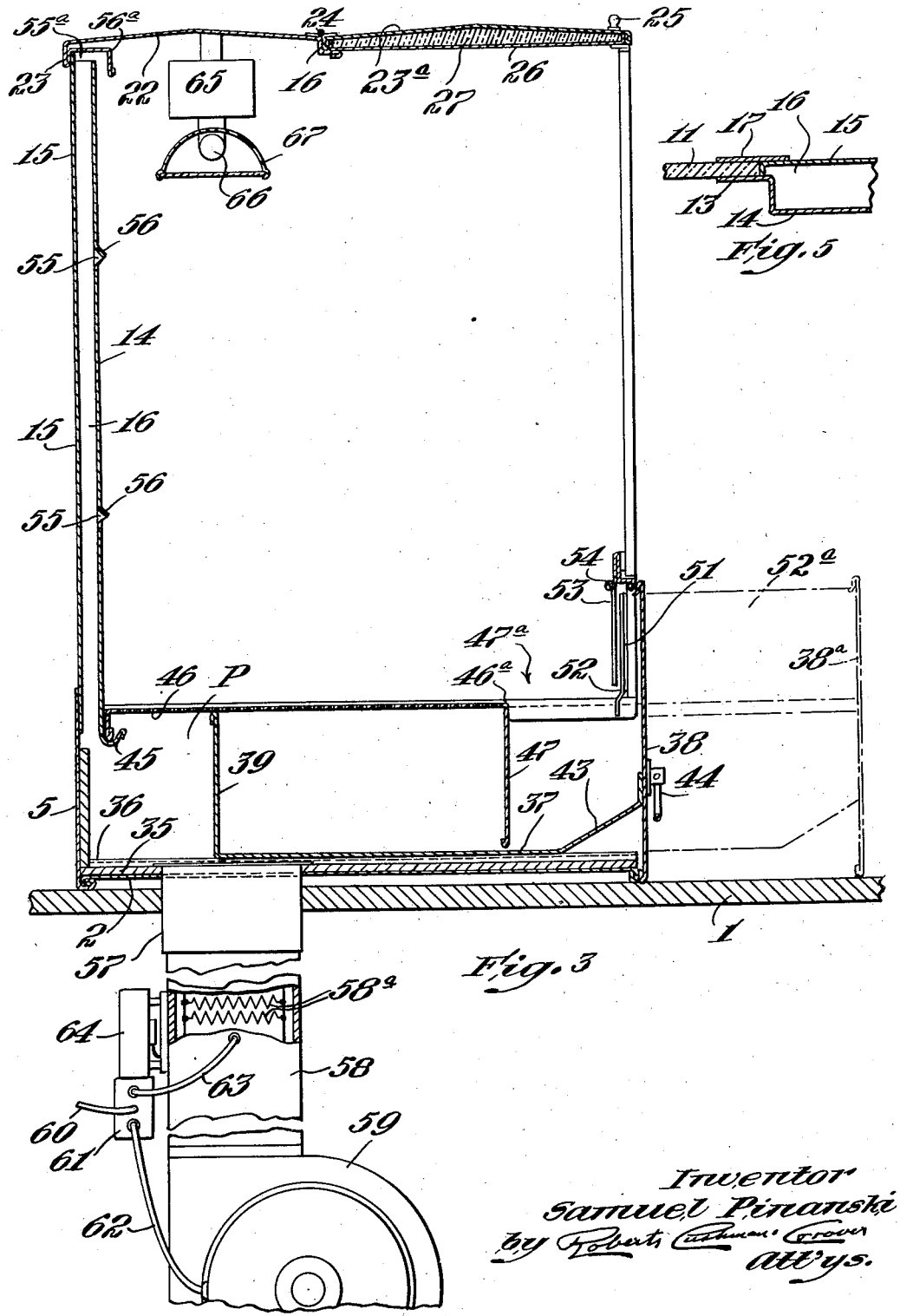
Fig. 3 is a vertical section, to larger scale, on the line 3—3 of Fig. 1, indicating, in broken lines, the dispensing position of the drawer.
Figure 4:
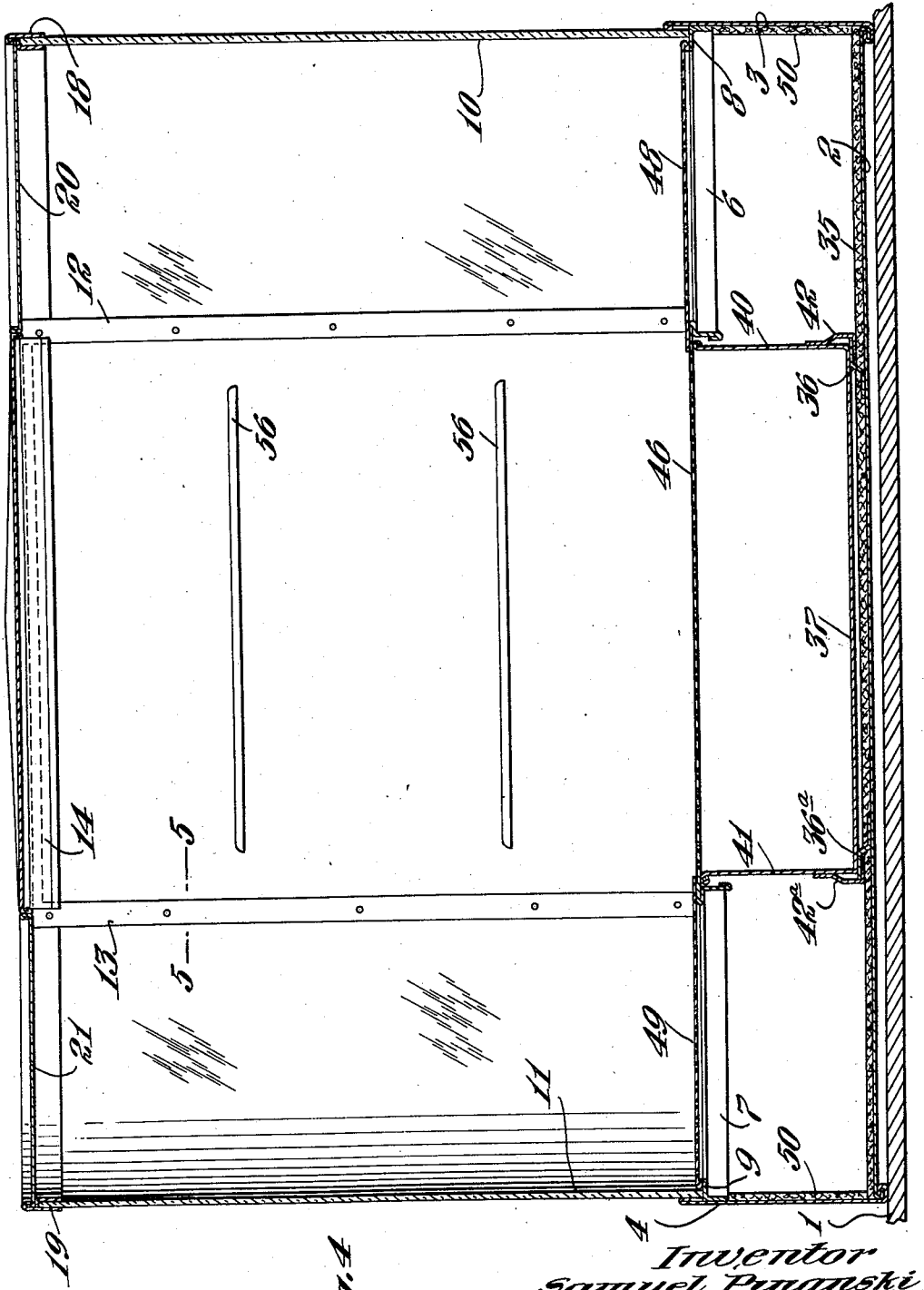
Fig. 4 is a vertical section on the line 4—4 of Fig. 1, to larger scale.

The horizontal flanges 8 and 9 of the bars 6 and 7 are directed inwardly and form supports for the lower edges of the vertically elongate semi-cylindrical transparent panels 10 and 11. These panels may be of glass or of other transparent material, for example, one of the synthetic resins, and form the end walls of the upper storage and display chamber of the cabinet. The rear vertical edges of the panels 10 and 11 engage the rear surfaces of flange members 12 and 13 respectively (Fig. 4), formed at the opposite edges of a rear plate 14 (Figs. 3 and 5). This plate 14 is spaced forwardly from a parallel plate 15 so as to form between them a vertical flue 16. At its opposite edges the plate 15 is provided with flange members 17 (one of which is shown in Fig. 5) which are disposed behind the vertical rear margins of the respective panels 10 and 11, so that such margins are, in effect, disposed within vertical channels formed by the sheet metal of the back structure.

The upper edges of the panels 10 and 11 are disposed within downwardly open channel members 18 and 19 (Fig. 4) suitably curved to conform to the panels 10 and 11, and these channel members 18 and 19 support top plates 20 and 21 (Fig. 4), respectively, of sheet material, which form top closures for the semi-cylindrical spaces within the panels 10 and 11. These plates 20 and 21 are secured air-tight to the channel members 18 and 19, for example by soldering, brazing, or by appropriate rolled joints.

A rear top member 22 has a flange 23 which overlaps the upper edge of the back member 15, and which is secured to the latter by solder, welding or the like, the top member 22 extending from the inner edge of the plate 20 to the inner edge of the plate 21, and being united to the latter by welding or soldering, and extending forwardly a distance preferably substantially half the front-to-rear width of the cabinet. At its forward edge this plate 22 is secured to an angle bar 16 to which are attached hinges 24 connecting a cover member 23a to the plate 22, so that the cover member may be swung upwardly and rearwardly. The rear edge of this cover member normally rests against the horizontal flange of the angle bar 16, the cover being provided with a knob 25 by means of which it may be raised. Preferably this cover comprises spaced upper and lower members, the lower member 26 forming a support for a body 27 of heat insulating material.

The forward edges of the transparent panels 10 and 11 are housed in vertical channel members 28 and 29 which form the sides of an opening for the reception of a front door having a frame 30 which is hinged at 31 to the right-hand member 28, the door preferably having a latch 33 at its left-hand side, engageable by a suitable retainer on the left-hand member 29. The upper portion of this door frame constitutes a support for the forward edge of the cover 23a. Preferably the door has a transparent panel 34 of glass or other suitable material.

The bottom member 2 of the base of the cabinet supports a layer 35 (Fig. 3) of insulating material and the side walls and back of the base are preferably insulated. Parallel guide members 36 and 36a (Fig. 4), respectively, having lower flanges fixed to the bottom wall 2, form supports for the bottom 37 (Fig. 3) of a dispensing drawer. This drawer has the front wall 38 which extends above the base, preferably to the lower edge of the front door. The drawer also comprises the rear walls 39 and the side walls 40 and 41. Preferably, fixed side guides 42 and 42a (Fig. 4) bear against the outer surfaces of the side walls 40 and 41, so as to constrain the drawer to move smoothly in and out. A brace member 43 connects the bottom member 37 and the front wall 38 of the drawer, and a handle 44 is secured to the outer surface of the front wall to facilitate movement of the drawer.

The angle bars 6 and 7 (Fig. 4) of the base support perforated plates 48 and 49 (Figs. 4 and 1) which form the floors of the spaces within the panels 10 and 11, and also support a perforated plate 46 forming the floor of the main portion of the storage chamber. The perforated portion of plate 46 terminates at a point 46a spaced from the plane of the front wall of the cabinet, the plate then extending down to form the apron 47 constituting the effective rear wall for the space within the drawer, this forward part of the drawer always freely communicating with the storage chamber above the base by means of the aperture 47a at the forward edge of the floor 46. Through this aperture the material in the storage chamber flows by gravity into the forward portion of the drawer.

To the members 28 and 29, below the front door, there are secured a pair of hinged wings which, when the drawer is pulled forwardly (as shown in broken lines in Fig. 3) may be swung into the position indicated at 52a, so as to form upward extensions of the side walls 40 and 41 of the drawer, thus providing an open-topped dispensing receptacle having an effective depth of substantially the height of the forward wall 38 of the drawer. One wing 52 and its hinge 51 are shown in Fig. 3. In order to guard the opening below the front door, when the wings are disposed as shown in broken lines in Fig. 3, there is provided a flap 53, supported at 54, and closing the space between the lower portions of the parts 28 and 29.

The wall 14 of the cabinet is provided with several transversely elongate horizontal slots 55 (Fig. 3) each preferably provided with a downwardly and forwardly inclined louvre. The upper end of the flue 16 is open at 55a and is guarded by a downwardly directed deflector member 56a.

The bottom 2 of the cabinet is provided with an opening at its rear part which receives a downwardly directed sleeve 57 (Fig. 3) which may be secured to the bottom of the cabinet in any desired manner, and which is designed to extend down through a corresponding opening in the support 1. This sleeve is connected to a heater casing 58 which receives air at superatmospheric pressure from a suitable motor-driven blower 59. Electrical current is supplied through a conduit 60 from any suitable source, the conduit 60 entering a distributing box 61 from which cables 62 and 63 lead to the blower motor (not shown) and to a heating coil 58a of any suitable type arranged within the casing 58. A suitable thermostat device 64, whose sensitively responsive element is exposed to the air within the casing 58, or which alternatively, if desired, may be arranged within the storage chamber, controls the flow of current through the cable 63 to the heating element.

Preferably, in the upper rear portion of the cabinet, there is arranged a support 65 for a lamp 66, having a reflector 67, the lamp being supplied with current by means of a suitable conductor, not shown. The lamp 66 may, if desired, be colored so as to impart a pleasing color to the contents of the cabinet, and if desired color changing arrangements may be used thereby to provide an attractive and interest-arousing effect.

Preferably the thermostat 64 is set to provide a substantially constant temperature, depending upon the material to be dispensed, but for use in dispensing popped corn, of the order of 120° F., and the blower is driven at such a rate as to provide a slight superatmospheric pressure within the cabinet so that there is always an outward flow of air from the cabinet through any places where leakage might occur, and also through the open top of the dispensing drawer. Air from the heater is delivered through sleeve 57 into the space P behind the drawer, this space, and in fact all of the space within the base, not occupied by the drawer, constituting a plenum chamber from which the air flows up through the openings in plates 46, 49 and 48, and up through flue 16, and is distributed throughout the contents of the storage chamber. With the thermostat responsive to the air in the heater as illustrated and set for 120° F. the temperature in the cabinet and the temperature of the material in the open drawer is maintained in the range of from about 105° to 120° F.

In use, the material to be dispensed is delivered into the cabinet through the door 23ᵃ, which, when open, provides a large entranceway through which the material, for example, popped corn, may be dumped. This material piles up on the perforated floor plates 46, 48 and 49, and in the freely visible storage space within the panels 10 and 11, and when lighted by the lamp 66 presents a very pleasing and attractive appearance. When the material is to be dispensed, the drawer is pulled forwardly to the broken line position shown in Fig. 3, and the side members 52 are swung outwardly so as to provide sides for the open portion of the drawer. The material from the cabinet flows down through the opening 47ᵃ into the forward portion of the drawer from whence it may be scooped up by the operator for delivery to purchasers. Throughout the operation of the apparatus warm air is delivered by the blower 59 and the heater 58ᵃ into the space behind the rear member 39 of the drawer, thence flowing upwardly through the perforated floor plates 46, 48 and 49, and also through the flue 16 and from the latter downwardly onto or through the piled up contents of the storage chamber, thereby exposing the contents to constant gentle flow of heated air. This hot air passing through the material keeps the latter hot and crisp, and since no air can get at the contents of the cabinet except this hot and dry air delivered by the heating device and blower, the contents of the cabinet are protected from atmospheric moisture and it is found that as a practical matter it may be kept fresh and crisp for a long period, even for several weeks.

If it be desired to stop the dispensing operation temporarily, the members 52 may be folded back and the drawer closed, thus bringing the forward wall 38 of the drawer into such a position as completely to close the space beneath the frame of the front door, thus excluding air from the interior of the cabinet.

The transparent front door, in addition to the transparent end panels 10 and 11, provides a clear view of the interior of the cabinet so that its contents are readily visible to the passer by. If it be desired to permit the odor of the material, for example popped corn, to escape freely as a further inducement to purchase, the top door 23ᵃ may be slightly opened and the superatmospheric pressure existing within the cabinet will cause a slight outflow of air from this partly opened door. Ordinarily enough air escapes from the open top of the dispensing drawer to accomplish this purpose.

The device thus provided is light in weight, but very strong and durable, it occupies but little space, and may easily be transported from place to place.

While ordinarily the heating of the air is sufficient to dry it enough for the purpose, it is contemplated that if desired the air from the blower, either before or after passing through the heater, may be caused to flow through moisture-removing means of any suitable and customary type, thereby actually to remove moisture from the air before it is admitted to the dispensing cabinet. However, as already noted, wholly satisfactory results may be obtained under most conditions merely by the heating of the air before admitting it to the cabinet.

While one desirable embodiment of the invention has been illustrated by way of example, it is to be understood that the invention is not necessarily limited to this precise embodiment, but is inclusive of any and all modifications falling within the scope of the appended claims.

I claim:

1. Apparatus for use in preserving and dispensing popped corn, comprising a storage chamber for the popped corn to be dispensed, said storage chamber having substantially imperforate back, side and top walls whereby the part of the storage chamber which is located above its floor is substantially segregated from the atmosphere, an open topped dispensing receptacle having its bottom portion at least located below the floor of the storage chamber and having side and front walls which define an open topped dispensing portion, said dispensing portion, during dispensing use at least, extending outwardly from the front wall of the storage chamber and with at least a substantial portion thereof located below the floor of the storage chamber, a freely open dispensing aperture near the base of the storage chamber through which popped corn is free to flow from the storage chamber to the dispensing receptacle by gravity at all times during dispensing use at least, said dispensing receptacle communicating with the atmosphere at all times during dispensing use through its open top only, and means operative to continuously deliver heated air under superatmospheric pressure into the storage chamber, thereby to maintain a continuous flow of heated air downwardly from the storage chamber through said aperture and into the receptacle, thence outwardly and upwardly through the popped corn confined within the side and front walls of said outwardly extending dispensing portion of the receptacle and thence to the atmosphere through said open top of said dispensing portion of said receptacle, whereby the popped corn in the storage chamber and throughout said dispensing portion of the receptacle is maintained at a substantially constant temperature of the order of the temperature of the heated air and the odor of the popped corn is diffused to the atmosphere by the heated air passing upwardly through the popped corn confined in said dispensing portion of said receptacle.

2. A preserving and dispensing cabinet comprising a storage chamber of relatively large capacity, having imperforate back, side and top walls and a perforate floor whereby the part of said storage chamber which is located above said floor is substantially air-tight, a plenum chamber beneath said floor, said perforations in the floor affording communication between the plenum chamber and the storage chamber, a flue leading upwardly from said plenum chamber and having spaced delivery openings for delivering air into the storage chamber, means for supplying warm air under pressure to the plenum chamber, and a dispensing receptacle of relatively small capacity slideable in and out of the cabinet beneath the floor of the storage chamber, said floor being provided with a continuously open aperture whereby material flows by gravity from the storage chamber to the receptacle, said dispensing receptacle normally being partially withdrawn from the cabinet to permit ready access to its contents and the escape of warm air therethrough.

3. A display and dispensing cabinet comprising a storage chamber, having imperforate back, side and top walls and a perforate floor whereby the part of said storage chamber which is above said floor is substantially air-tight, a plenum chamber beneath said floor, said perforations in the floor affording communication between the plenum chamber and the storage chamber, a vertical flue leading from said plenum chamber substantially to the top of the storage chamber and having longitudinally extending vertically spaced and downwardly directed louvres arranged to deliver air from the flue into the chamber in a downward direction, means for supplying hot air at superatmospheric pressure to the plenum chamber, and an open-topped dispensing receptacle in constant communication with said storage chamber and into which material from the latter flows by gravity.

4. A preserving and dispensing cabinet comprising means defining a storage chamber having end, bottom, back and front walls, means operative to deliver heated air at a substantially constant temperature into the storage chamber, a slideable drawer which receives material from the storage chamber through an opening in a wall of the storage chamber, at least when the drawer is open, wings pivotally mounted on the cabinet adjacent to the opposite sides of the drawer and adapted to be rotated to constitute upper side walls for the open portion of the drawer, said drawer, when open, providing a dispensing receptacle from which material may be freely removed through its open top.

5. A preserving and dispensing cabinet comprising a bottom portion having therein an opening and a sliding drawer which, when open, constitutes a dispensing receptacle, said drawer having a front wall which is higher than said bottom portion, wings pivotally mounted on the cabinet adjacent to opposite sides of the drawer and adapted to be rotated to constitute side walls for the open portion of the drawer of substantially the same height as its front wall, a storage chamber in said cabinet above said bottom portion, said chamber being closed at its sides, back, front and top, and having a perforate floor, said bottom portion having therein a plenum chamber located adjacent to the floor of the storage chamber and from which air is delivered upwardly through said perforate floor into the storage chamber, the floor of the storage chamber also having a delivery aperture so arranged that the storage chamber always communicates freely with the drawer, and means operative to supply heated air at superatmospheric pressure to the plenum chamber in said bottom portion.

6. A preserving and dispensing cabinet comprising a bottom portion having bottom, end and rear walls, and a runway therein for a drawer whose front wall, when the drawer is closed, constitutes a closure for the forward end of said runway, a storage chamber above said bottom portion, said chamber having semi-cylindrical end panels, a back comprising spaced plates defining a vertical air flue between them, a front including a door panel and a top including a normally closed filling opening, said bottom portion having therein a plenum chamber communicating with the storage chamber and with the flue, the latter having delivery orifices also communicating with the storage chamber, a drawer, slidable on said runway and constituting a dispensing receptacle, the floor of the storage chamber also having a delivery aperture so constructed and arranged that the storage chamber always communicates freely with the drawer, and means operative to deliver air at a substantially constant elevated temperature and at superatmospheric pressure to the plenum chamber.

7. A preserving and dispensing cabinet comprising a storage chamber of relatively large capacity, having a perforate floor, imperforate back, side and top walls and a door pivotally mounted to said top wall normally closing a filling opening therein whereby the part of said storage chamber which is located above said floor is substantially air-tight, a plenum chamber beneath said floor, said perforations in the floor affording communication between the plenum chamber and the storage chamber, means for supplying to said plenum chamber warm air at superatmospheric pressure and a dispensing receptacle of relatively small capacity slideable in and out of the cabinet beneath the floor of the storage chamber, said floor being provided with a continuously open aperture whereby material flows by gravity from the storage chamber to the receptacle, said dispensing receptacle normally being withdrawn from the cabinet to permit ready access to its contents and the escape of warm air therethrough.

8. Apparatus for use in preserving and dispensing popped corn comprising a storage chamber for the popped corn to be dispensed, said storage chamber having back, side and top walls and a perforate floor, a plenum chamber beneath said floor, said perforations in the floor affording communication between the plenum chamber and the storage chamber, an open topped dispensing drawer slideable in and out of the cabinet beneath the floor of the storage chamber, said dispensing drawer having bottom, side and front walls which define an open topped dispensing portion which extends outwardly from the front wall of the storage chamber with at least a substantial portion thereof located below the floor of the storage chamber when the drawer is slid to open position, a freely open dispensing aperture in the floor of the storage chamber through which material is free to flow from the storage chamber to the dispensing drawer by gravity at all times, said dispensing drawer being normally maintained in open position wherein said dispensing portion thereof communicates with the atmosphere through its open top only, and means operative to continuously deliver heated air under superatmospheric pressure into the plenum chamber thereby to maintain a continuous flow of heated air upwardly to the storage chamber through its perforate floor, thence downwardly from the storage chamber through said dispensing aperture and into said dispensing drawer, thence outwardly and upwardly through the popped corn confined within the side and front walls of said outwardly extending dispensing portion of the drawer and thence to the atmosphere through the open top of said outwardly extending dispensing portion of the drawer, whereby the popped corn in the storage chamber and throughout said dispensing portion of the drawer is maintained at a substantially constant temperature of the order of the temperature of the heated air and the odor of the popped corn is diffused to the atmosphere by the heated air passing upwardly through the popped corn confined in said dispensing portion of the drawer.

9. A preserving and dispensing cabinet comprising a storage chamber for the material to be dispensed, said storage chamber having back, side and top walls and a floor, a plenum chamber beneath said floor, said floor having perforations therein affording communication between the plenum chamber and the storage chamber, a runway for a drawer beneath the floor of the storage chamber, the front of the cabinet having an opening at the end of said runway, an open topped drawer in said runway, said drawer being slideable outwardly of the cabinet through said opening and said drawer having side walls, a back wall, a front wall and a bottom wall, said front wall of the drawer constituting a closure for said opening when the drawer is closed, a freely open dispening aperture in the floor of the storage chamber through which material is free to flow from the storage chamber to the drawer by gravity at all times, a stop member depending from the floor of the storage chamber a substantial distance into the drawer between the back and front walls of the drawer, and means operative to continuously deliver heated air under superatmospheric pressure into the plenum chamber, said stop member being engageable with the back wall of the drawer to limit outward sliding movement of the drawer and engageable with the material in the drawer to limit inward sliding movement of the drawer.

10. Method of treating popped corn in a dispensing apparatus having a storage chamber, an open topped dispensing receptacle having its bottom portion, at least, located below the floor of the storage chamber and having side and front walls which define an open topped dispensing portion extending outwardly from the front wall of the storage chamber at all times during dispensing use of the apparatus and with a substantial portion thereof located below the floor of the storage chamber, and a freely open dispensing aperture near the base of the storage chamber which affords communication between said chamber and said dispensing receptacle at all times during dispensing use at least, which comprises warming air, continuously introducing the warmed air into the storage chamber at such a rate as to maintain a slightly superatmospheric pressure in the storage chamber and continuously passing the warmed air downwardly from the storage chamber through said aperture to below the floor of the storage chamber and into the receptacle, thence outwardly and upwardly through the popped corn confined within the side and front walls of said outwardly extending dispensing portion of said receptacle and thence to the atmosphere through the open top of said dispensing portion, whereby the popped corn in the storage chamber and throughout the dispensing portion of said receptacle is maintained at a substantially constant temperature of the order of the temperature of the warmed air and the odor of the popped corn is diffused to the atmosphere by the warmed air passing upwardly through the popped corn confined in the dispensing portion of said receptacle.

SAMUEL PINANSKI.

REFERENCES CITED

The following references are of record in the file of this patent:

UNITED STATES PATENTS

| Number | Name | Date |
| --- | --- | --- |
| 1,259,632 | King | Mar. 19, 1918 |
| 1,781,473 | Owen | Nov. 11, 1930 |
| 647,445 | Gillet et al. | Apr. 10, 1900 |
| 1,495,294 | Fisher | May 27, 1924 |
| 1,973,347 | Kelly | Sept. 11, 1934 |
| 2,005,501 | Kelly | June 18, 1935 |
| 1,552,904 | Yaxley | Sept. 8, 1925 |
| 130,695 | Bowdon | Aug. 20, 1872 |
| 1,025,373 | Cooke | May 7, 1912 |
| 1,207,840 | Benjamin | Dec. 12, 1916 |
| 1,763,633 | Simmons | June 10, 1930 |
| 822,627 | Phenis | June 5, 1906 |
| 1,763,253 | Palmer | June 10, 1930 |
| 2,248,633 | Lee | July 8, 1941 |
| 2,263,057 | Urbanek | Nov. 18, 1941 |
| 251,433 | Gunn | Dec. 27, 1881 |
| 822,990 | Schroder | June 12, 1906 |
| 580,832 | Sale | Apr. 13, 1897 |
| 1,532,718 | Shover | Apr. 7, 1925 |
| 1,232,323 | Kasmeier | July 3, 1917 |

OTHER REFERENCES

"Problems of the Dehydration Industry," by Donald K. Tressler, published in The Scientific Monthly, October 1943, pages 347-353.

Certificate of Correction

Patent No. 2,423,342.

July 1, 1947.

SAMUEL PINANSKI

It is hereby certified that error appears in the printed specification of the above numbered patent requiring correction as follows: Column 9, line 29, for "dispening" read *dispensing*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.*